(12) United States Patent
Lucas

(10) Patent No.: US 7,634,971 B2
(45) Date of Patent: Dec. 22, 2009

(54) CONVERTIBLE VESSEL

(75) Inventor: Francis Lucas, Toulon (FR)

(73) Assignee: Constructions Industrielles de la Mediterranee - CNIM, Paris (FR)

( * ) Notice: Subject to any disclaimer, the term of this patent is extended or adjusted under 35 U.S.C. 154(b) by 87 days.

(21) Appl. No.: 11/664,609

(22) PCT Filed: Sep. 27, 2005

(86) PCT No.: PCT/EP2005/011131

§ 371 (c)(1),
(2), (4) Date: May 18, 2007

(87) PCT Pub. No.: WO2006/037663

PCT Pub. Date: Apr. 13, 2006

(65) Prior Publication Data

US 2007/0251440 A1 Nov. 1, 2007

Related U.S. Application Data

(60) Provisional application No. 60/615,580, filed on Oct. 5, 2004.

(51) Int. Cl.
*B63B 1/00* (2006.01)
(52) U.S. Cl. ................... 114/61.15; 114/61.18
(58) Field of Classification Search .......... 114/258, 114/61.1, 61.28, 61.29, 61.15, 61.18
See application file for complete search history.

(56) References Cited

U.S. PATENT DOCUMENTS

| 3,835,802 | A | * | 9/1974 | Vernede et al. ............. 114/260 |
| 5,493,989 | A | | 2/1996 | Anderson et al. |
| 5,921,195 | A | * | 7/1999 | Yilmaz ........................ 114/48 |
| 6,877,450 | B2 | | 4/2005 | Schmidt et al. |
| 2002/0164231 | A1 | | 11/2002 | Lucas et al. |
| 2003/0033967 | A1 | | 2/2003 | Hayman |

FOREIGN PATENT DOCUMENTS

| DE | 198 38 374 | 7/1999 |
| EP | 1457416 | 9/2004 |
| FR | 2450192 | 9/1980 |
| FR | 2620677 | 3/1989 |
| WO | WO 2004/043546 A2 | 5/2004 |

* cited by examiner

*Primary Examiner*—Stephen Avila
(74) *Attorney, Agent, or Firm*—Westerman, Hattori, Daniels & Adrian, LLP

(57) ABSTRACT

A vessel includes an heavy loaded catamaran, one or several movable buoyant roll-on/roll-off platform(s) (3); a moving element is provided for draft variation in heavy deep seas so that the platform(s) (3) may be raised or lowered between the hulls thereby selectively changing the flotation of the vessel. In the upper position, the vessel is a deep-sea catamaran, in an intermediate position the platform(s) is buoyant and a canal is formed between platform bottom and catamaran keels, in the lower position, platform bottom and catamaran are even-keel converting the catamaran in a shallow water craft, in the lowest position, the catamaran is raised above water for docking.

38 Claims, 8 Drawing Sheets

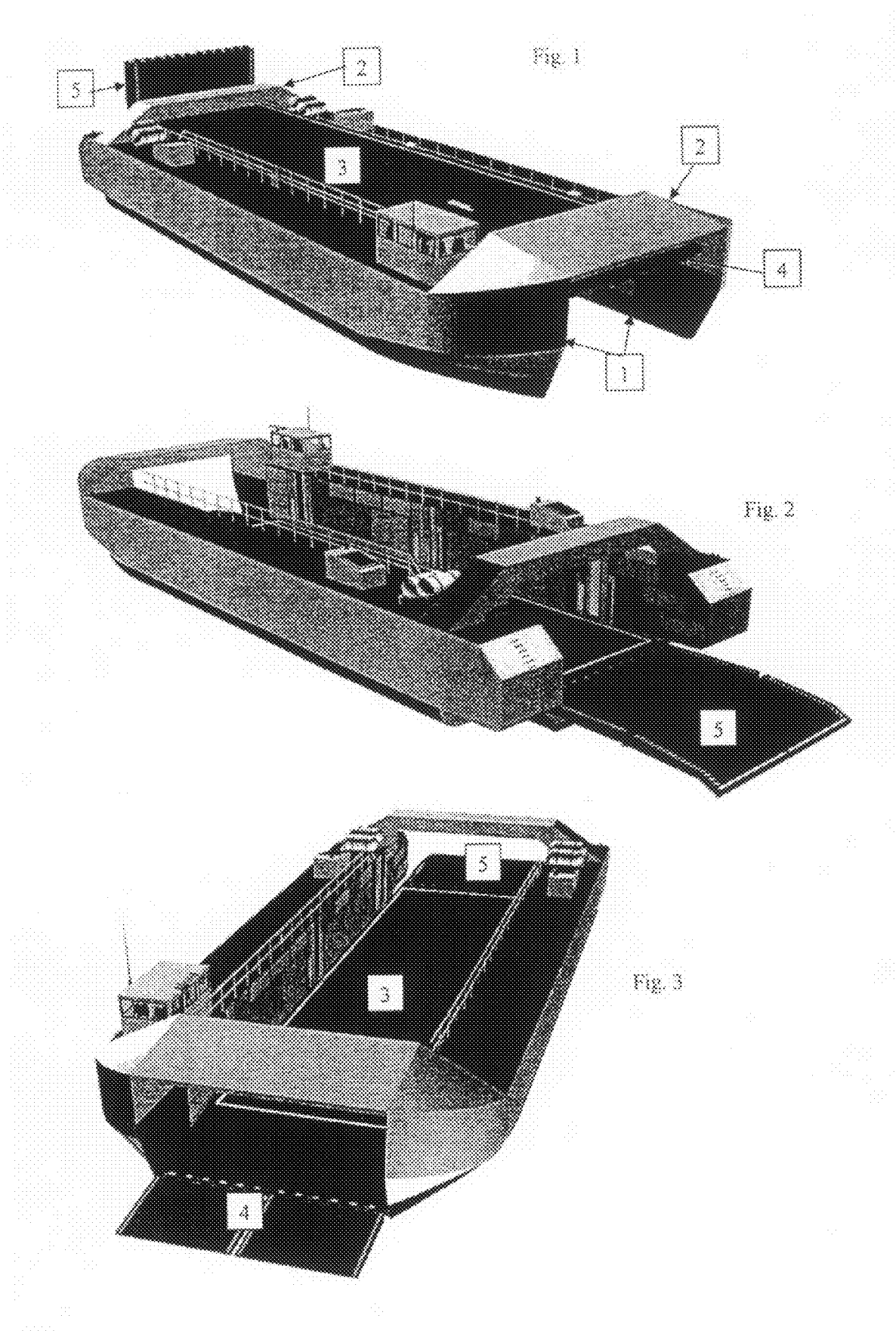

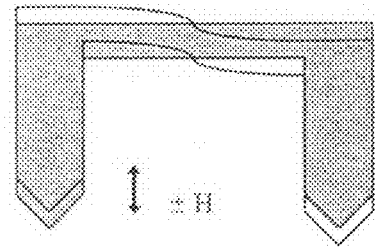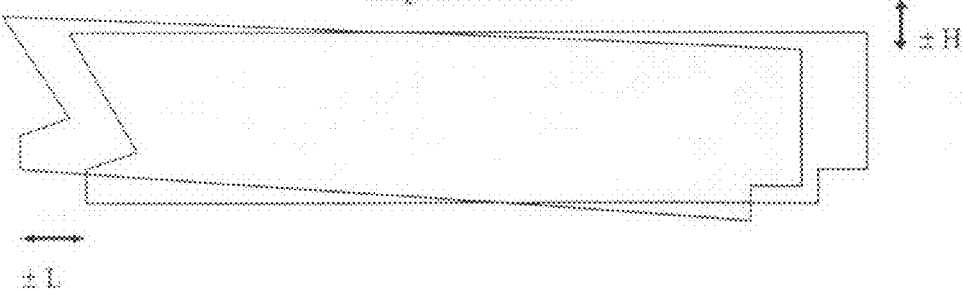
Fig. 8 Displacement on quarter sea
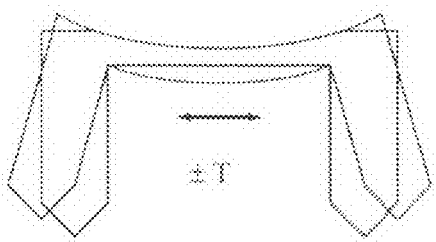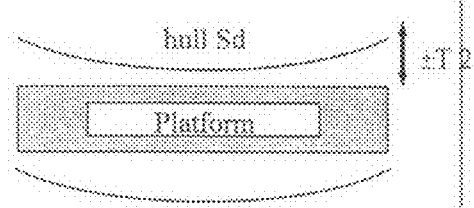
Fig. 9 Deformation on beam seas
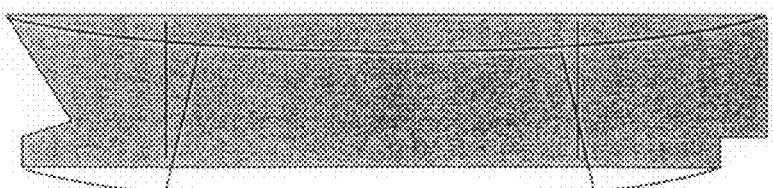
Fig. 10 Deformation on static load and head seas

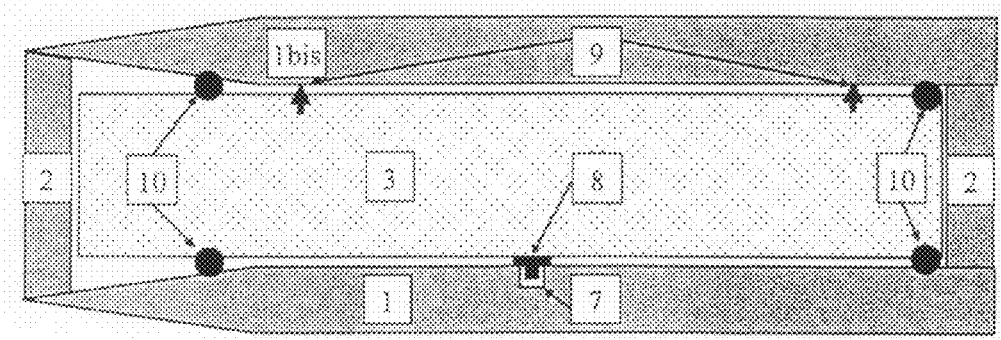
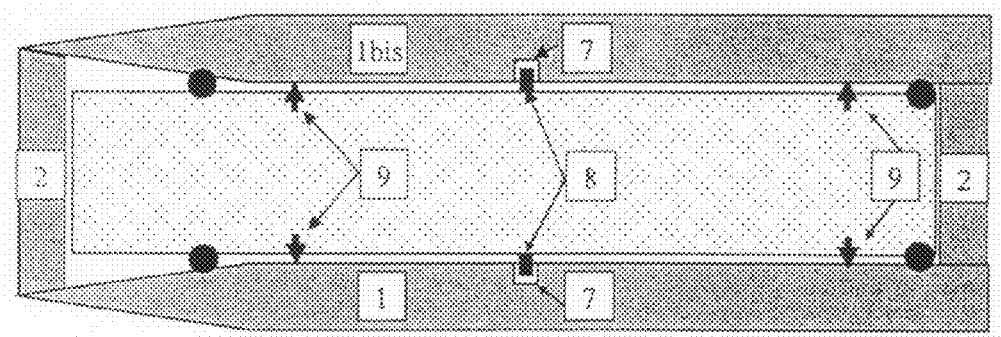
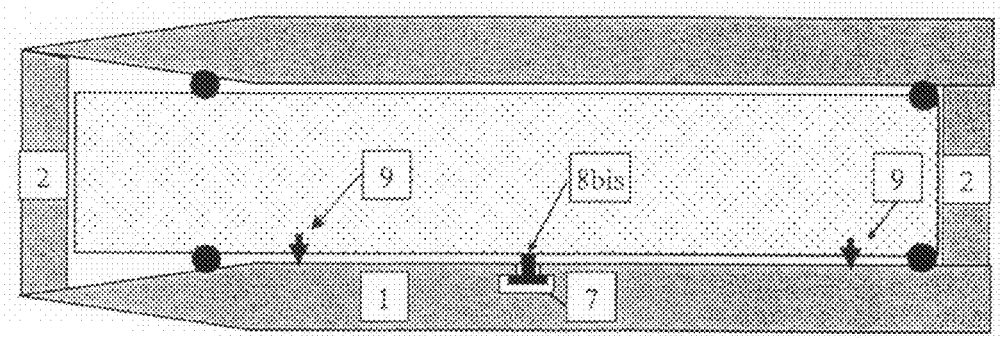
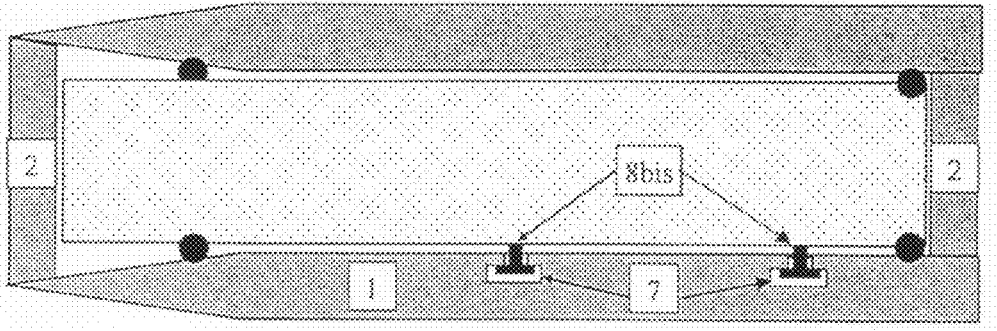

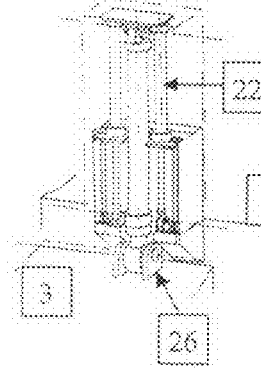
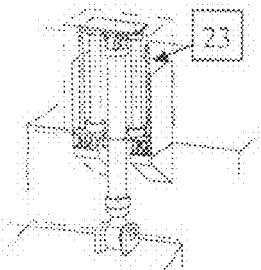
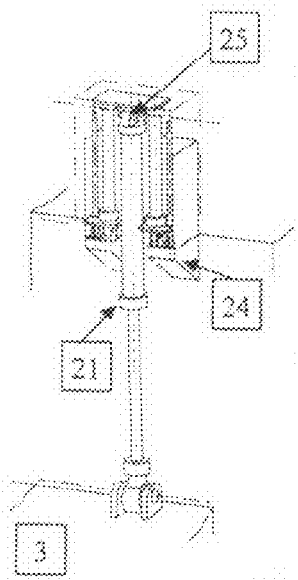
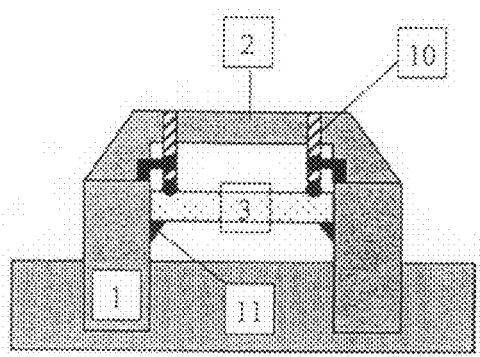
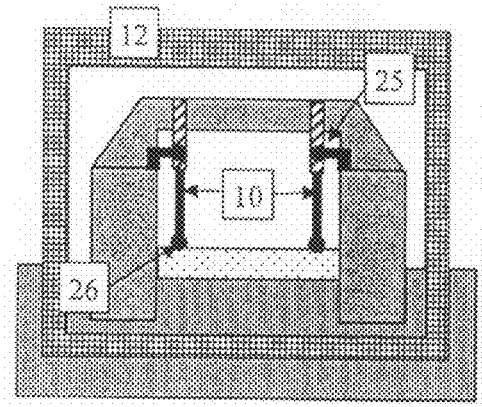
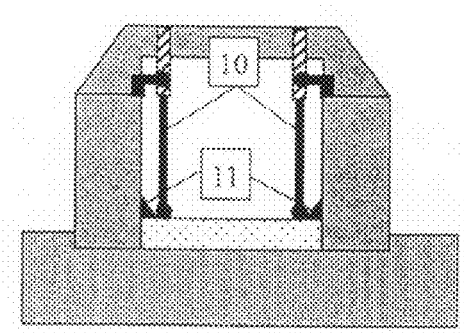
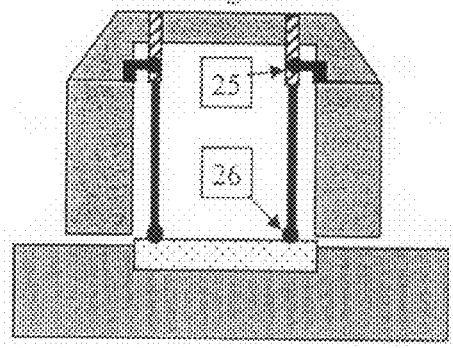

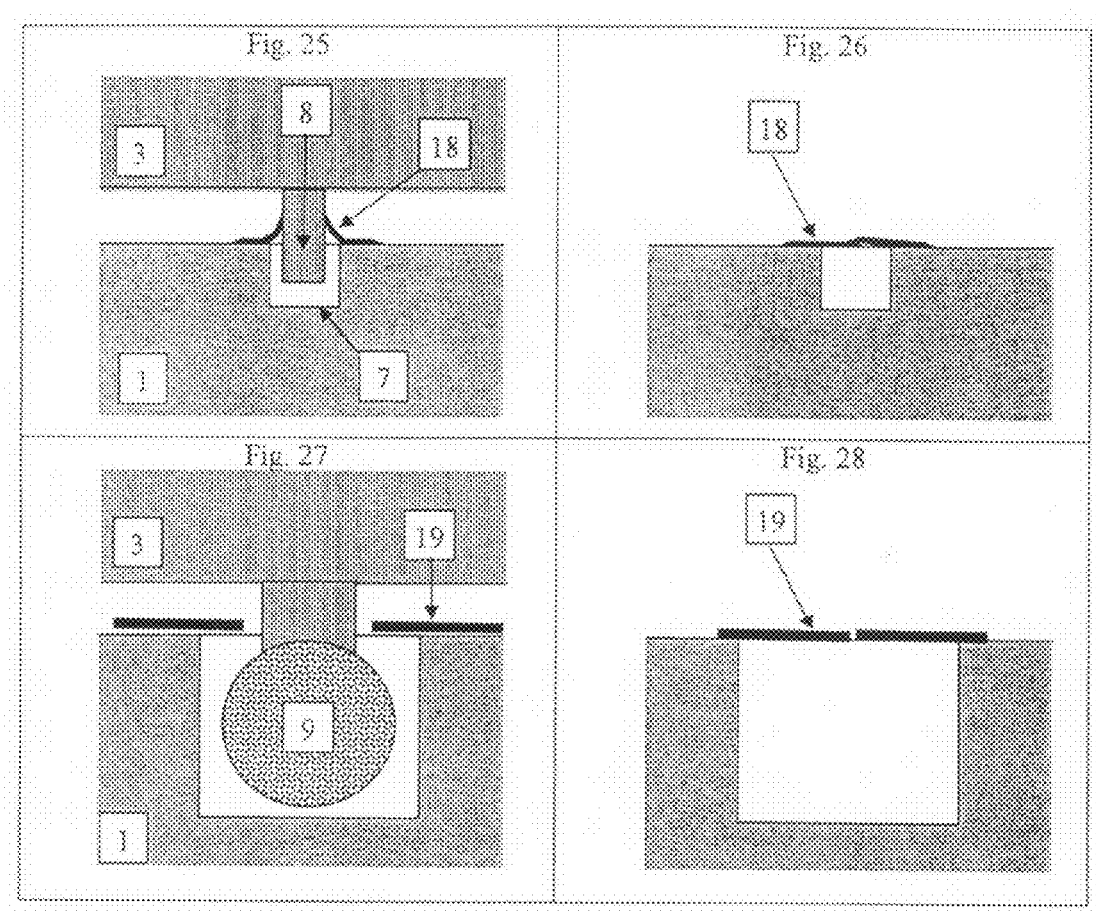

Deep sea draft

Shallow waters draft

CONVERTIBLE VESSEL

FIELD OF INVENTION

The present invention relates to an improved convertible vessel designed for fast transit, good maneuverability and seaworthiness in open deep seas, designed for loading heavy cargos onto an unequipped shoreline and onto a logistic vessel in high seas.

BACKGROUND OF THE INVENTION

At the present time, loadings to an unequipped shoreline are carried out using bay crafts, landing ships or air cushion crafts.

A bay craft or a landing ship is characterized with a shallow draft allowing landings on shoreline of gentle gradient, but has the drawback of low speed due to its hull shape and limited capability for movement and seaworthiness as a result of its shallow draft and the fact that it is rather top heavy.

An high see ship, passengers or cargo vessel, allowing fast transit, good maneuverability and seaworthiness is characterized with a deep draft which prevents it from getting close to a gentle sloping shore.

Convertible vessels had been considered to change a deep-sea catamaran into a shallow water craft. This type of convertible vessels has been described by Malin (U.S. Pat. No. 3,437,067), Zadrowny (U.S. Pat. No. 3,898,946), Matsumoto (JP 5,921,195), Yilmaz (U.S. Pat. No. 5,921,195). The conversion was considered through a movable buoyant body of the vessel raised or lowered between the hulls, the movable body (or platform) being connected to adjacent hulls.

Some improvements are proposed in the present invention to solve various problems occurred in the definition of these convertible vessels.

First, one must be able to perform the conversion in heavy seas. The conversion is needed in open seas near the coast between shore (platform in lower position) and deep-sea (platform in upper position). The conversion is needed when loading/unloading in deep sea on a logistic vessel, the ro-ro transit being only possible when the platform is in the lower position. The conversion is also needed in deep seas when entering/leaving the well dock of a landing ship, the platform being in an intermediate position to avoid the suctions effect of the very shallow waters of the well and avoid a too great height not compatible with well dock clearances. This suction effect is observed on all existing landing ships entering/leaving a narrow well of a dock landing ship and is the origin of many bottom damages.

A conversion have some similarities to cargo handling, Farrel (U.S. Pat. No. 3,537,413), Broes (U.S. Pat. Nos. 3,786, 772, and 3,908,573), Hoehne (DE 30,19 706), and Kirby (U.S. Pat. No. 4,011,825) had detailed calm water cargo handling of buoyant cargos but not a conversion in heavy seas. In a conversion in heavy seas, the connections of the movable body of the vessel to adjacent hulls are subject to wedging according the large deformations of the hulls (torsion on quarter's seas, transversal flexion on beam seas, longitudinal flexion on head seas).

Second, the conversion of fast heavy cargos catamaran into a shallow water craft induces much body plan design difficulties to accommodate a propulsion system able to work either in deep-sea catamaran configuration and shallow water craft configuration. The body plan has to maximize the buoyancy in shallow waters. The body plan has to minimize the stern drag in catamaran configuration. Each of these requirements is antagonist with the other and the body plan becomes unrealistic without special design when the convertible vessel is a high speed and heavy loaded vessel.

Third, the housing of the connections of the movable body of the vessel inside the adjacent hulls needs a large space and cuts the whole shell plating. The structural hull strength is then affected. The hull hydrodynamic resistance is also strongly increased by such appendices or holes, thus reducing the vessel speed accordingly.

In the former patent EP 1,123,862, I have described such a convertible vessel, with a movable body not connected to adjacent hulls, independent of the catamaran structure, with a quick description of the moving means. The present patent describes precisions and improvements to face the structural and hydro-dynamical problems.

BRIEF DESCRIPTION OF THE INVENTION

The object of the present invention is to produce an improved convertible vessel which is characterized, on the one hand, by a fast transit, a good maneuverability and seaworthiness and, on the other hand, by its ability to load/unload heavy loads onto gentle sloping shorelines and onto a logistic vessel in high seas.

In consequence, the subject of this invention is a roll-on/roll-off vessel, with draft variation when sailing in high seas at constant displacement, loading loads on unequipped shorelines or onto an logistic vessel in high seas, characterized in that its comprises:

a catamaran, with two hulls permanently assembled at the upper part by decks or beams as usual in shipbuilding, and a propulsion system (including steering) of the catamaran, designed to sail either with reduced draft in shallow waters or with deep draft, and one or several buoyant mobile platform(s) between the two hulls of the catamaran with or without a deployable ramp at one or each end of the vessel, and a moving mean making it possible to maneuver the platform in open sea between high and low position.

The first improvement of the convertible vessel avoids wedging during the conversion between cruise mode (platform un the upper position) and the landing mode (platform in the lower position). Wedging occurs through the combination of catamaran distortions at sea and the motion of the platform connected to adjacent hulls.

The improvement consists in deleting the connections to adjacent hulls in the transversal direction that link these two hulls through the platform. The platform is then completely free to move in the transversal direction avoiding any wedging by the adjacent hulls and is then able of a lift when the vessel is still sailing in high rough seas. The moving mean of the platform is produced as follow:

one vertical guide on the catamaran structure and corresponding pin attached to the platform to block the relative longitudinal displacements of the platform, and two lateral hulls of the catamaran block the transversal relative motions, or alternatively these motions are transversally blocked by a guide in one of the hulls, and at least three lifting points, and preferably four, each one articulated at both extremities, to vary the relative position of the platform(s) and the hulls of the catamaran, so that the catamaran hulls support the platform(s) above water in upper position, and the mobile platform(s) supports the catamaran up to the platform(s) bottom line in lower position. The platform may be stopped in any intermediate position, and peculiarly allow the entrance with a limited bottom suction in a very shallow canal such as the well of a dock vessel. The canal, formed below the platform and between hulls, increases the free section of water between the convertible vessel and the well of the dock landing ship, reducing the corresponding shallow water Froude number, reducing the bottom suction and corresponding damages on bottom structure.

The moving mean is actuatable in both directions (up and down) with static and dynamic efforts in both directions as the catamaran may support the platform(s), and the platform(s) may support the catamaran. The moving system does not take part of the catamaran structure during moving. The various lifting points are synchronized in order to minimize deformations of the platform and overloads.

According to the present invention the platform(s) is locked in operational positions through a connection of hulls and platform(s), to secure the platform(s) against failures of the moving mean, grounding and collisions.

According to the present invention the two hulls of the catamaran may be connected, at their bottom part, to limit relative transversal motions between side hulls on rough seas.

According to the present invention the shape of the body plan of hulls and platform(s) of a convertible vessel allows sailing with an high draft (heavy loaded catamaran) and with a very low draft (mobile platform in the lower position, light ship) through peculiar hull forms which maximize the buoyancy in shallow waters and minimize the aft section when sailing. They are adapted to ground damage for loading on an unequipped shoreline.

To increase buoyancy in shallow waters the hulls are fitted with bulbous bow and bulbous stern.

The high-powered propulsion needed for fast transit is performed preferably through hydro-jets. Hydro-jets are placed usually on the aft transom bulkhead of the hulls with an impeller shaft-line placed below the draft of the vessel. The hydro-jet must be located very close to the bottom line in order to be able to pump water in shallow water configuration and light ship condition. The high draft and the very deep transom bulkhead, in loaded catamaran configuration, increase the drag and corresponding hydrodynamic resistance, and the vessel obtains a poor speed even with high power. To minimize this drag the hydro-jets have to be accommodated at the end of a bulbous stern instead of an accommodation on the aft transom as usual; they are then used in an unconventional deep draft with water all around the jet when sailing as a catamaran, and as usual when the vessel is supported by platform(s). The bulbous stern reduces drastically the aft drag and is designed to insure an appropriate flow of the water around the hydro-jets, thus increasing the propulsive ratio. These hydro-jets are preferably provided with directional nozzles and reverser spouts to provide excellent maneuverability and a very short stopping distance at any speed and vessel configuration.

The platform fore and aft body plan is profiled to sail ahead and astern with reduced front wave.

According to the present invention the hull skin of a convertible vessel may be maintained flush in any position of the platform(s), whatever are the moving means, via flexible flaps over the guide(s), or via retractable devices, or via any other mean to avoid hydrodynamic turbulence in way of shell openings and corresponding speed reduction.

Other features and advantages of the present invention will become apparent from the description given hereinafter with reference to the appended drawings witch illustrate one embodiment thereof which is entirely nonlimiting. In the drawings:

DESCRIPTION OF FIGURES

FIG. 1 is a perspective view of the convertible vessel in catamaran configuration.
FIG. 2 is a perspective view of the convertible vessel in shallow waters configuration.
FIG. 3 is an other perspective view of the convertible vessel in shallow waters configuration.
FIG. 4 is a lateral view on center line of the ship.
FIG. 5 is a lateral view on center line of a hull.
FIG. 6 is a section upper view below deck.
FIG. 7 is an upper view of the vessel.
FIGS. 8 to 10 are diagrammatic views showing the vessel deformations under various seas (quarter sea—FIG. 8—, beam seas—FIG. 9—, head seas—FIG. 10—),
FIG. 11 depicts moving means, guide and centering dampers in a plan view of the vessel transversal motion guided on adjacent hulls,
FIG. 12 depict an alternative for guides and centering dampers,
FIG. 13 depicts moving means, guide and centering dampers in a plan view of the vessel transversal motion guided on one hull,
FIG. 14 depict an alternative for guides and centering dampers,
FIGS. 15 to 17 depict a typical lifting point,
FIG. 18 depicts an elevation of the convertible vessel in catamaran configuration,
FIG. 19 depicts an elevation of the convertible vessel in intermediate position,
FIG. 20 depicts an elevation of the convertible vessel in shallow-water craft configuration,
FIG. 21 depicts an elevation of the convertible vessel in docking position,
FIGS. 25 and 26 depict flaps covering moving mean guides,
FIGS. 27 and 28 depict shutters covering lifting points nesting in the shells.

DETAILED DESCRIPTION OF THE INVENTION

Figure 4:
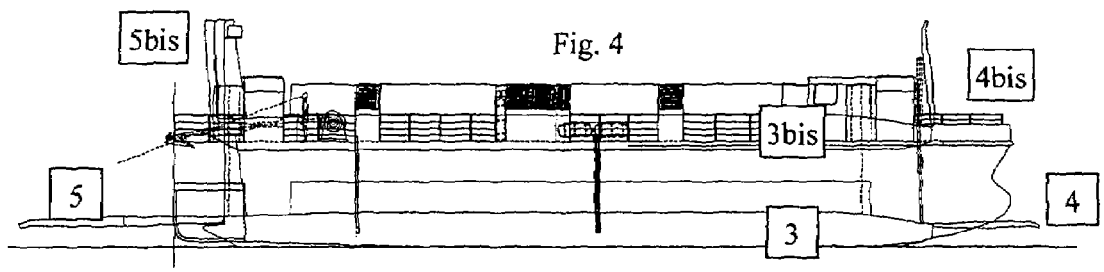
FIGS. 4 to 7 are various views of the general arrangement of the vessel.

The present invention provides an improved convertible vessel.

Referring to FIG. 1 it may be seen that the vessel comprises a catamaran with two adjacent hulls 1 and upper beams or decking structures connecting permanently the two hulls as usual in shipbuilding 2.

The vessel comprises also one or several buoyant mobile platform(s). According to one exemplary embodiment, FIG. 1 shows a platform 3, at each of the ends of the platform(s) is a deployable ramp so that the platform(s) and the ramps constitute a roll-on roll-off platform. FIGS. 2 and 3 show fore ramp 4 and aft ramp 5. As a preference, the ramps are of the fold-out double fold type. In the folded position they protect the loads transported by the vessel from waves and from spray.

Referring to FIG. 4, the buoyant mobile platform is shown in the lower position 3 for shallow waters configuration and in the upper position 3*bis* for the catamaran position. Fore and aft ramps 4 and 5 are shown in the upper position 4*bis* and 5*bis*.

Figure 5:
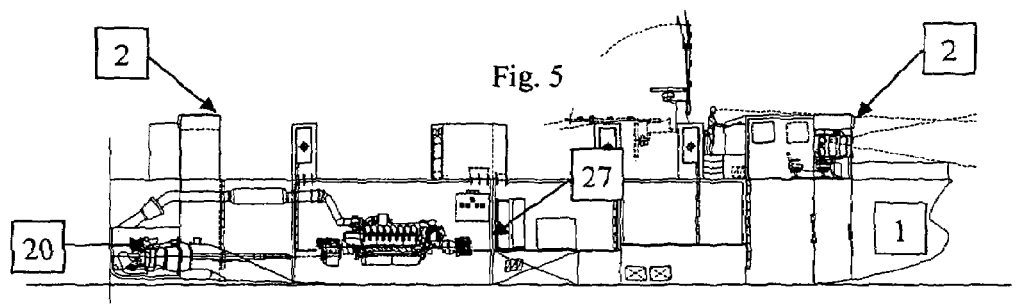
Figure 6:
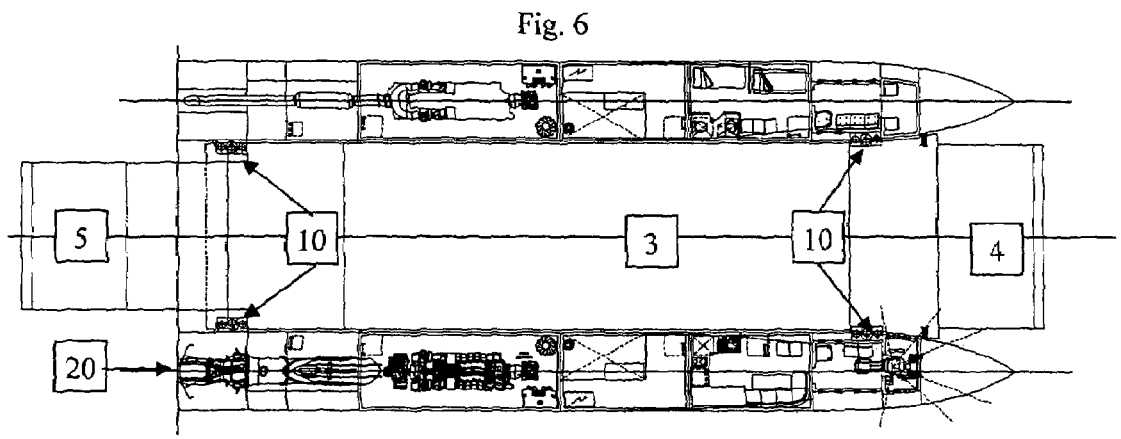
Figure 7:
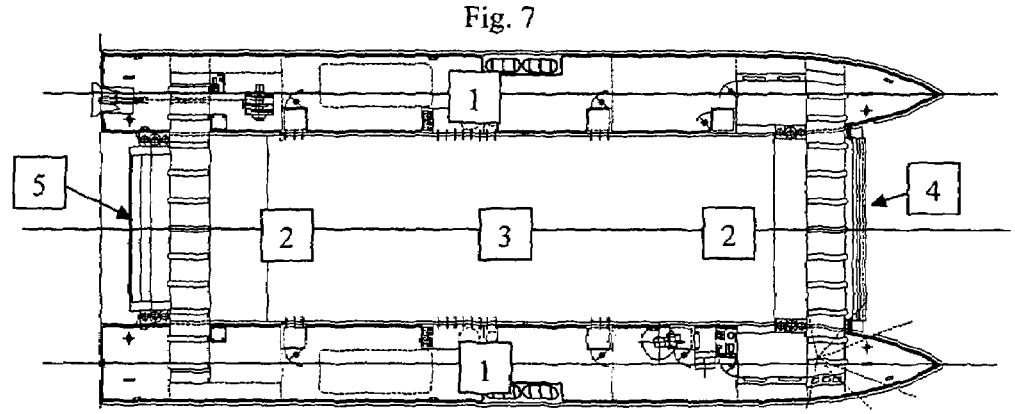

Referring to FIGS. 5 and 6 it may be seen that the vessel comprises a propulsion system 20 of the waterjet type or the propeller and rudder or of the pumjet type, or any other system.

FIG. 8 diagrammatically depicts the deformations of a catamaran under a quarter sea. The adjacent hulls and connecting structures are twisted under the torsion of diagonal waves. FIG. 9 diagrammatically depicts the deformation under beam seas. The transversal waves open and close periodically the transverse section of the catamaran. FIG. 10 diagrammatically depicts deformation of one hull under head sea or under static load. Two parallel guides as shown on FIG. 10 follow the deformation of the hull beam and become secant. Referring to the diagrams of the deformations of a catamaran in various seas depicted in FIGS. 8 to 10 it may be seen obviously that connections of a rigid platform to the adjacent hulls of a catamaran lead either to a wearing condition with narrow tolerances of the moving mean or to an other wearing and shocks conditions when tolerances are enlarged to cover hull deformations.

The vessel also comprises a moving mean depicted diagrammatically in FIGS. 11 to 22. The moving system is designed to allow the platform(s) 3 to be brought in heavy seas respectively into the raised or into the lowered position in which the platform(s) 3 provides additional buoyancy allowing the draft of the vessel to be reduced.

Referring to FIG. 11, it may be seen that according to one exemplary embodiment of the invention, the moving mean of the platform(s) in regard to the catamaran may be produced through lifting points and guides as follow:

At least three lifting points and preferably four are needed to rise or lower the platform. Referring to FIG. 11 four lifting points 10 insure the motion.

One vertical guide 7 accommodated in a recess of the shell of one of the two catamaran hulls associated with corresponding pin 8 attached to the platform stops any relative longitudinal motion during the lift. Two adjacent hulls 1 and 1 bis insure the transversal position of the platform 3. Lateral inertia forces are transmitted from platform 3 to hulls 1 through the guide 8/7 and to hull 1 bis through two points 9 that may be equipped with dampers to reduce corresponding shocks.

Referring to FIG. 12, an other embodiment of the invention is proposed for the guides when longitudinal distortion under quarter seas is low, as follow:

One vertical guide 7 accommodated in a recess of the shell of each of the two catamaran hulls associated with corresponding pins 8 attached to the platform stops any relative longitudinal motion during the lift. Two adjacent hulls 1 and 1 bis insure the transversal position of the platform 3. Lateral inertia forces are transmitted from platform 3 to hulls through four points 9 that may be equipped with dampers to reduce corresponding shocks.

According to an other embodiment of the invention, the transversal relative motions of the platform are transversally blocked by a guide in one of the hulls. Referring to FIG. 13 it may be seen one vertical guide 7, accommodated in a recess of the shell of one of the two catamaran hulls associated with corresponding nut 8*bis* attached to the platform, stops any relative longitudinal motion during the lift. The same guide 7 and nut 8*bis* insure the transversal position of the platform 3. Lateral inertia forces are transmitted from platform 3 to hulls 1 through the guide 8*bis*/7 and two points 9 that may be equipped with dampers to reduce corresponding shocks block the rotation if ever.

Referring to FIG. 14, an other embodiment of the invention is proposed for the guides to block the possible rotation of the platform:

Two vertical guides 7 accommodated in a recess of the shell of one of the two catamaran hulls associated with corresponding nuts 8*bis* attached to the platform stops any relative longitudinal and transversal motion during the lift.

Each lifting point is articulated at each of its extremities respectively 25 and 26 as shown in FIGS. 15 to 22.

The moving mean is then independent of the hull deformations at sea. In the upper position the convertible vessel is a catamaran as shown in FIG. 18. In an intermediate position, FIG. 19, a canal is formed between the two hulls below the platform bottom. Such canal improves the water flow when entering the well deck of a logistic vessel 12 and eliminates the sucking effect that yields shocks between the hull of the entering vessel and the bottom of the well deck.

According to one embodiment of the invention the moving mean is produced by four lifting points. Each of them is sized so that the moving may be performed when one point is out of function. Each of them is disconnected easily and quickly. This redundancy allows the platform to be stopped in any position without locks, even with passengers.

The platform is locked in operational positions, to secure the platform(s) against failures of the moving mean, against groundings shocks and against collisions. More specifically, FIGS. 18 and 20 illustrate such locks 11 in upper and lower position for vessel in the catamaran configuration (FIG. 18) and shallow water configuration (FIG. 20) which connect hulls and platform(s). Locks are produced in form of pins or brackets, possibly retractable ones, or mechanical latches.

FIG. 21 depicts diagrammatically the vessel in docking condition.

According to one exemplary embodiment the articulated lifting points may be produced either by double acting cylinders 10 acting directly on the mobile platform(s) (FIG. 19) or acting via articulated arms associating two lifting points (scissors) or may be produced by hydraulic actuators, screw jacks, chain jacks, wire rope and linear winches, rack and pinions, or any other appropriate system. It is also possible, to this end, to use a combination of the aforementioned systems or any other means of providing power in two directions. These lifting points 10, articulated on their extremities 25 and 26, allow a free motion of the platform(s) between the hulls independently of any sea deformation of the catamaran at sea. The lifting points 10 are powered through electric or hydraulic units 27 (FIG. 5). These lifting points 10 are actuatable in both directions. The movements of the platform(s) 3 may be controlled from the catamaran bridge or from any other part of the vessel.

Figure 22:
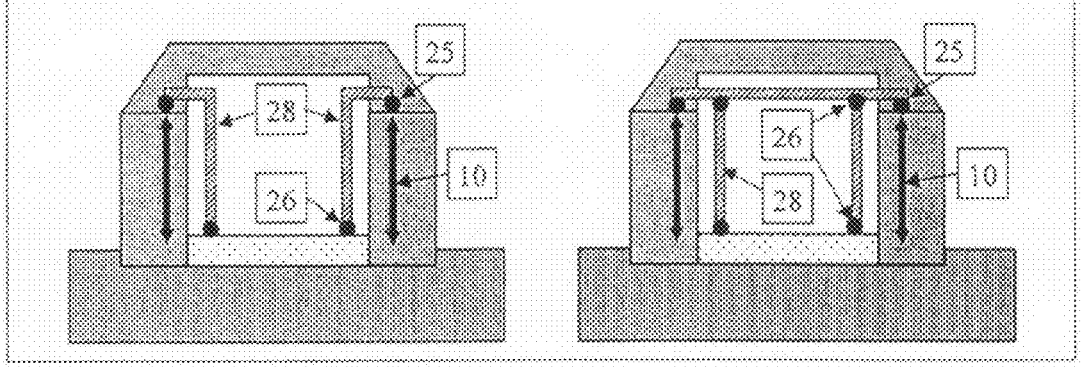
FIG. 22 depicts an elevation of the convertible vessel in shallow-water craft configuration.

According to one embodiment of the invention, an articulated connecting rod and a lifting point can produce the articulated lifting point. FIG. 22 shows an example of such an articulated point 26 with a connecting rod 28 articulated between platform 3 and the lifting point 25, and the lifting point 10.

To minimize the overall height of the lifting system, especially when the convertible vessel is used inside a well dock vessel 12 as shown in FIG. 19, the lifting point may be produced as a telescopic cylinder 10 articulated on the hull 25 and on the platform 26.

FIGS. 15 to 17 depict a telescopic lifting point using a combination of state of the art double acting cylinders. Two cylinders 22 attached to the hull 1 on console 24 raise or lower the connection 25 of the third cylinder 21, well guided through guides 23. The third cylinder 21 is attached through an articulated connection 26 to the platform 3. According an other embodiment a connecting rod may take place of the third cylinder.

In the exemplary embodiment illustrated in FIG. 18 to 22 synchronizing of various lifting points 10 avoids platform deformation and overload of the lifting system. This synchronism is performed through the control of the prime mover of each lifting point (electric, hydraulic, etc.) or through the control of the displacement of each lifting point, or through any other system.

Figure 23:
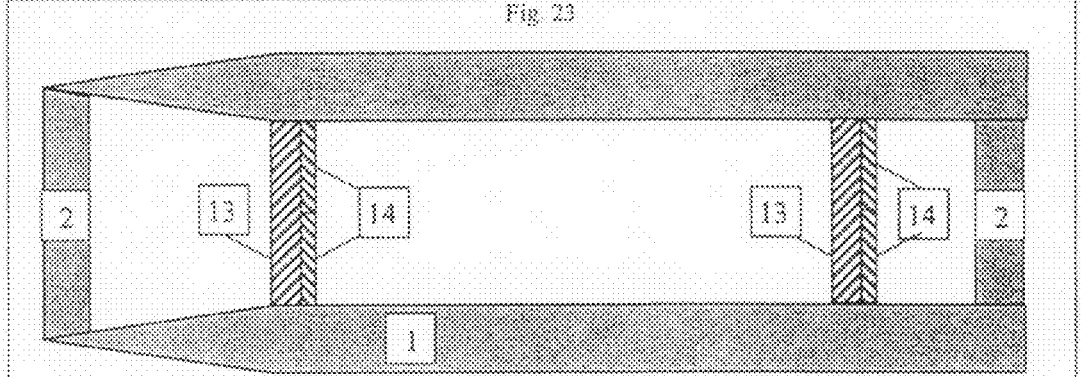
FIGS. 23 and 24 depicts bottom connections of the hulls.
Figure 24:
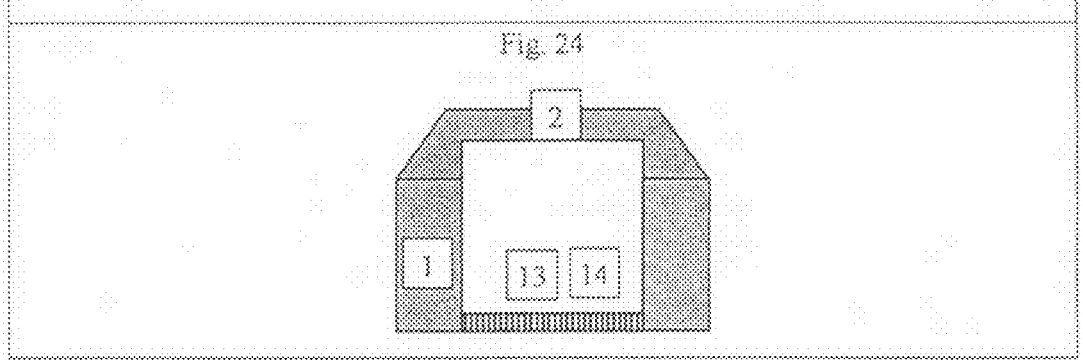

According to one exemplary embodiment, FIGS. 23 and 24 diagrammatically depict a connection at the bottom of the two hulls 1 of the catamaran by profiled bottom crossmembers 13, limiting transversal deformation of the catamaran in rough seas. As a result, this produces a structure that allows the catamaran to be kept rigid independently of the mobile platform(s) 3 described hereinafter. In the exemplary embodiment depicted in the drawings these cross-members 13 are preferably being in the shape of wings so as to develop partial up-thrust effects ensuring speed improvement.

These cross-members 13 may be equipped with mobile flaps 14 as it can be seen in FIG. 23 so that the trim of the vessel can be adjusted according to the center of mass and the sea conditions. These flaps may also be used as stabilizers when sailing, particularly in rough seas. These cross-members nest in the bottom of the platform(s) 3 when they are in the lowest position.

Figure 29:
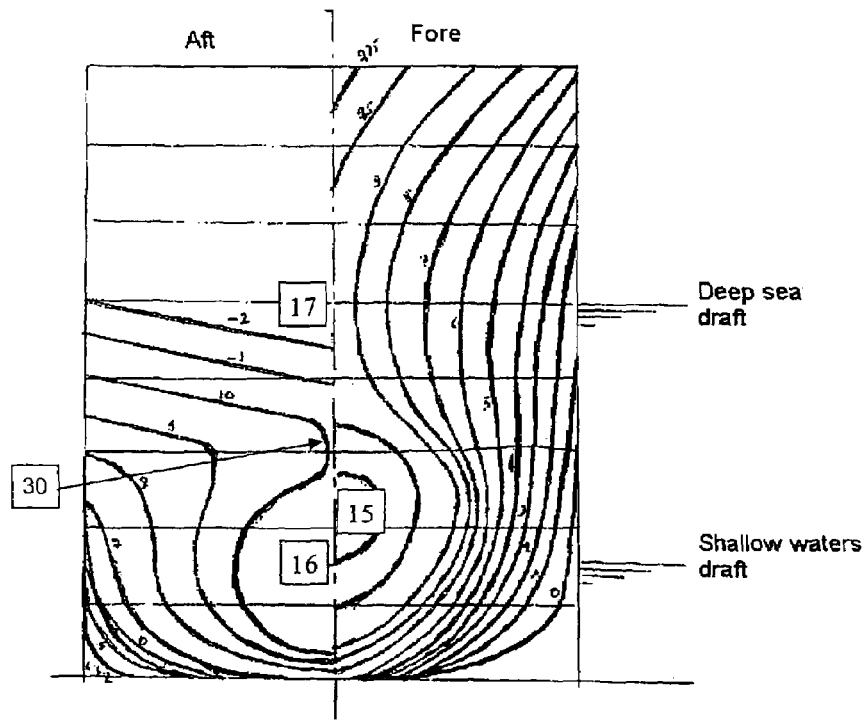
FIG. 29 shows a typical body plan of the hulls
Figure 30:
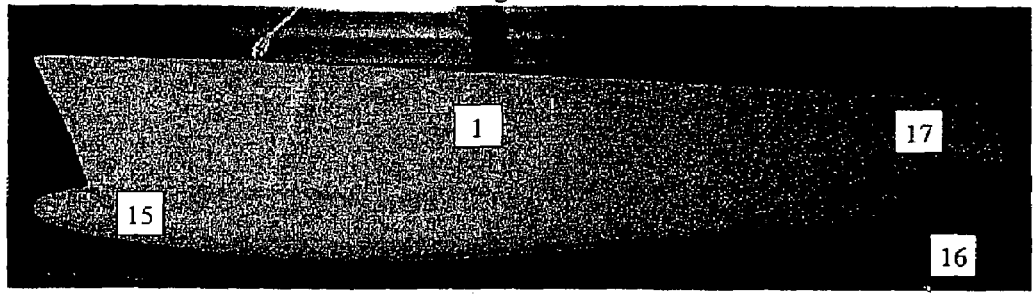
FIGS. 30 and 31 show models of hull forms.
Figure 31:
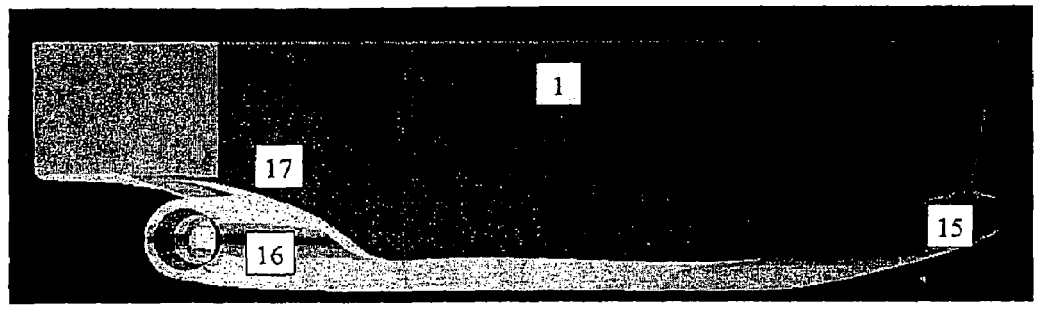

According to one exemplary embodiment, FIGS. 29 to 31, the body plan of the catamaran includes a bulbous bow 15 and a bulbous stem 16. This body plan maximizes the buoyancy in very shallow waters.

According to one exemplary embodiment, FIGS. 29 to 31, aft body of the catamaran hulls is divided into two parts. The upper one 17 is a standard stem with wide aft body to support hydro dynamically the vessel in high speed and reduce the pitch. The lower one 16 is a deep stern ended by the propulsion system. A skeg-faired structure 30 may link the two parts 16 and 17. The sections shown on FIG. 29 are respectively a fore body with a bulbous bow 15, an aft body with respectively a bulbous stem 16 supported eventually by a skeg 19, and an upper standard stem 17. Other arrangement of the aft body may be considered.

According to one exemplary embodiment, FIGS. 4, the fore and the aft body of the platform hull 3 are shaped for sailing ahead and astern.

The catamaran deep stems accommodate the propulsion system. This propulsion system may be of the hydro-jet type, or of the propeller and rudder type or any other type. Propulsion is preferably provided by hydro-jets 20 with directional nozzles and reverser spouts as shown in FIG. 5. These hydro jets are arranged symmetrically in the two lateral hulls 1, as near as possible of the bottom for shallow waters configuration. According to one exemplary embodiment it is also possible to provide lateral thrusters at the fore part of the hulls.

According to one exemplary embodiment of the invention the hulls skin may be maintained flush in any position of the platform(s), whatever are the moving means, via flexible flaps over the guide(s) 7, or via retractable devices, or via any other mean. FIGS. 25 and 26 depict flexible flaps 18 in way of the guide 7 and pin 8. FIGS. 27 and 28 depict mechanical shutters 19 in way of lifting points nests.

In transit (FIG. 1), or in shallow waters (FIG. 2), the vessel according to the invention has a configuration for:
significant fast speed capability even in choppy seas when the platform(s) is in the raised position;
excellent maneuverability in the transit position and of shallow waters position;
excellent sea-keeping in the transit position;
excellent safety during the platform(s) maneuvers when sailing in rough seas;
significant reduction in draft allowing an approach very close to shoreline, with the platform(s) in the lowered position with its running surface above water level, the presence of the front ramp reducing still further the amount of water to be negotiated;
a wide buoyancy surface in shallow waters to give low sensitivity to the center of mass and allows a great deal of flexibility in the way the load is distributed.

It must remain clearly understood that the present invention is not restricted to the embodiments described and/or mentioned hereinabove by way of non limiting examples but that it encompasses all alternative forms thereof.

The invention claimed is:

1. A convertible vessel, with draft variation when sailing at constant displacement, for loading loads on unequipped shorelines or onto an logistic vessel in high seas, comprising:
a catamaran having two hulls permanently assembled at their upper part by decks or beams,
a propulsion and steering system of the catamaran, designed to sail either with reduced draft in shallow waters or with deep draft, and
at least one buoyant mobile platform between the two hulls of the catamaran,
wherein the platform is linked to the catamaran in an articulated manner by an articulated linkage, wherein the articulated linkage allows the platform to move between high and low positions with respect to the catamaran, and also to move transversely with respect to at least one of the hulls when the catamaran is not subject to transverse deformation, so as to prevent wedging of the platform relative to the two lateral hulls when the platform is moved between high and low positions even if the catamaran is subject to transverse deformation.

2. A vessel as defined in claim 1 wherein the articulated linkage comprises moving means for moving the platform between high and low positions, said moving means comprising a guide system and at least three lifting points, each of the lifting points being articulated at both extremities.

3. A vessel as defined in claim 2 wherein the guide system comprises a vertical guide in one of the adjacent hulls and a corresponding pin attached to the platform and engaged in the vertical guide.

4. A vessel as defined in claim 2 wherein the guide system comprises a vertical guide in the shell of each of the two catamaran hulls associated with corresponding pins attached to the platform and engaged in the respective vertical guides.

5. A vessel as defined in claim 2 wherein the guide system comprises a vertical guide in one of the adjacent hulls and corresponding nut attached to the platform and engaged in the vertical guide.

6. A vessel as defined in claim 2 wherein the guide system comprises two vertical guides in the shell of one catamaran hull associated with two corresponding nuts attached to the platform and engaged in the two vertical guides, respectively.

7. A vessel as defined in claim 1 wherein dampers are installed between the platform and the two hulls.

8. A vessel as defined in claim 2 wherein the platform is locked in operational positions through locks connecting the hulls and the platform.

9. A vessel as defined in claim 1 wherein the lifting points are redundant to allow the platform to be stopped in any position for passengers transport.

10. A vessel as defined in claim 1 wherein the platform can be stopped at an intermediate stopping position to allow entrance inside a dock of a logistic vessel without shocks due to sucking effect.

11. A vessel as defined in claim 8 wherein the locks are in the form of pins, brackets or mechanical latches.

12. A vessel as defined in claim 2 wherein the lifting points are produced by double acting cylinders, articulated arms, hydraulic actuators, screw jacks, chain jacks, wire rope and linear winches, or rack and pinions.

13. A vessel as defined in claim 2 wherein each of the lifting points is produced by combination of an articulated connecting rod and a lifting point.

14. A vessel as defined in claim 2 wherein each of the lifting points is produced by a combination of (i) double acting cylinders, articulated arms, hydraulic actuators, screw jacks, chain jacks, wire rope and linear winches, rack and pinions, or an articulated connecting rod, and (ii) a lifting point.

15. A vessel as defined in claim 2 wherein the lifting points are synchronized in operation.

16. A vessel as defined in claim 1 wherein the hulls are further connected at their bottom part by transversely situated fore and aft wing-shaped cross members that are received within indentations formed on the underside of the platform when the platform is lowered into the contact with water.

17. A vessel as defined in claim 16 wherein the cross members are equipped with profiled flaps.

18. A vessel as defined in claim 1, wherein the hulls are equipped with bulbous bow and bulbous stem, and wherein the shape of the aft body of the hulls is divided in two parts, the first part being made of a standard stem in the upper part, the second part being made of a deep bulbous stem ended by the propulsion system in the lower part.

19. A vessel as defined in claim 18 wherein a skeg faired profiled structure links the aft deep stem and the aft upper stem.

20. A vessel as defined in claim 18 wherein the propulsion is of the hydro-jet type arranged symmetrically in the two lateral hulls.

21. A vessel as defined in claim 18 wherein the hydro-jet are used with an unconventional deep draft when sailing as a catamaran, and as usual when the vessel is supported by the platform.

22. A vessel as defined in claim 18, further comprising auxiliary thrusters provided at the front of each of the two hulls.

23. A vessel as defined in claim 1, wherein the lower part of the platform is shaped for sailing ahead and astern.

24. A vessel as defined in claim 1, wherein the hulls shell is maintained flush in any position of the platform.

25. A vessel as defined in claim 24 wherein the shell is maintained flush in way of moving guide nests with elastic gasket flaps.

26. A vessel as defined in claim 24 wherein the shell is maintain flush in way of lifting points nests with elastic gaskets flaps or mechanical shutters.

27. A vessel as defined in claim 1, wherein the platform is connected to at least one of the hulls through a guide system for guiding the displacement of the movable platform relative to the at least one hull.

28. A vessel as defined in claim 27, wherein the guide system prevents longitudinal movement of the platform relative to the at least one hull in any given height position of the platform.

29. A vessel as defined in claim 28, wherein the guide system also prevents transversal movement of the platform relative to the at least one hull in any given height position of the platform.

30. A vessel as defined in claim 1 wherein moving means link in an articulated manner the platform to the catamaran so that the platform is capable of moving between high and low positions and transversely.

31. A vessel as defined in claim 27 wherein moving means link in an articulated manner the platform to the catamaran so that the platform is capable of moving between high and low positions and transversely.

32. A vessel as defined in claim 31 wherein the moving means link in an articulated manner the platform to the two lateral hulls.

33. A vessel as defined in claim 1, comprising at least two buoyant mobile platforms.

34. A vessel as defined in claim 1 wherein the platform is provided at least to one end with a deployable ramp.

35. A vessel as defined in claim 2 wherein four lifting points are provided.

36. A vessel as defined in claim 11 wherein the locks are in the form of retractable pins or brackets.

37. A convertible vessel, with draft variation when sailing at constant displacement, for loading loads on unequipped shorelines or onto an logistic vessel in high seas, comprising:
  a catamaran having two hulls permanently assembled at their upper part by decks or beams,
  a propulsion and steering system of the catamaran, designed to sail either with reduced draft in shallow waters or with deep draft, and
  at least one buoyant mobile platform between the two hulls of the catamaran,
  wherein the platform is linked to the catamaran in an articulated manner so that the platform is capable of moving between high and low positions with respect to the catamaran, and the platform is also capable of freely moving transversely with respect to at least one of the hulls, to prevent wedging of the platform relative to the two lateral hulls when the platform is moved between high and low positions even if the catamaran is subject to transverse deformation,
  wherein the platform is linked in an articulated manner to the catamaran by moving means for moving the platform between high and low positions, said moving means comprising a guide system and at least three lifting points, each of the lifting points being articulated at both extremities.

38. A convertible vessel, with draft variation when sailing at constant displacement, for loading loads on unequipped shorelines or onto an logistic vessel in high seas, comprising:
  a catamaran having two hulls permanently assembled at their upper part by decks or beams,
  a propulsion and steering system of the catamaran, designed to sail either with reduced draft in shallow waters or with deep draft, and
  at least one buoyant mobile platform between the two hulls of the catamaran,
  wherein the platform is linked to the catamaran in an articulated manner so that the platform is capable of moving between high and low positions with respect to the catamaran, and the platform is also capable of freely moving transversely with respect to at least one of the hulls, to prevent wedging of the platform relative to the two lateral hulls when the platform is moved between high and low positions even if the catamaran is subject to transverse deformation,
  wherein the hulls are further connected at their bottom part by transversally situated fore and aft wing-shaped cross members that are received within indentations formed on the underside of the platform when the platform is lowered into the contact with water.

* * * * *